United States Patent [19]

White

[11] Patent Number: 4,567,638

[45] Date of Patent: Feb. 4, 1986

[54] METHOD FOR REMOVING DUAL WHEELS FROM TRACTORS

[75] Inventor: Larry D. White, Memphis, Mo.

[73] Assignee: Fabby Manufacturing Incorporated, Memphis, Mo.

[21] Appl. No.: 574,054

[22] Filed: Jan. 26, 1984

[51] Int. Cl.[4] .............................................. B23P 19/00
[52] U.S. Cl. .................................... 29/426.5; 254/104
[58] Field of Search ......... 254/104; 301/13 R, 135 M, 301/36 R; 29/426.5, 148.3, 426.1, 426.2, 426.3, 426.4, 426.6, 273, 253

[56] References Cited

U.S. PATENT DOCUMENTS 1,192,719 7/1916 Wells .................................... 254/104
2,327,297 8/1943 Woodruff ............................. 254/104
4,135,335 1/1979 Jensen .............................. 254/104 X

FOREIGN PATENT DOCUMENTS 84979 8/1983 European Pat. Off. .......... 301/36 R

*Primary Examiner*—Howard N. Goldberg
*Assistant Examiner*—John T. Burtch
*Attorney, Agent, or Firm*—Zarley, McKee, Thomte, Voorhees & Sease

[57] ABSTRACT

A wedge-shaped member is provided for facilitating the removal of a dual wheel from a primary wheel of a tractor. The member includes opposite sides which converge towards one end of the member to define a point. A handle is provided for positioning and carrying the member. To remove the dual wheel from the primary wheel, the nuts are removed from the tie-down bolts, and the wedge-shaped member is positioned such that the point thereof is adjacent and between the perimeter of the tires mounted upon the wheels. The tractor is then driven towards the member such that the increased width of the member is forced between the tires to separate the dual wheel from the primary wheel.

2 Claims, 7 Drawing Figures

U.S. Patent  Feb. 4, 1986  4,567,638
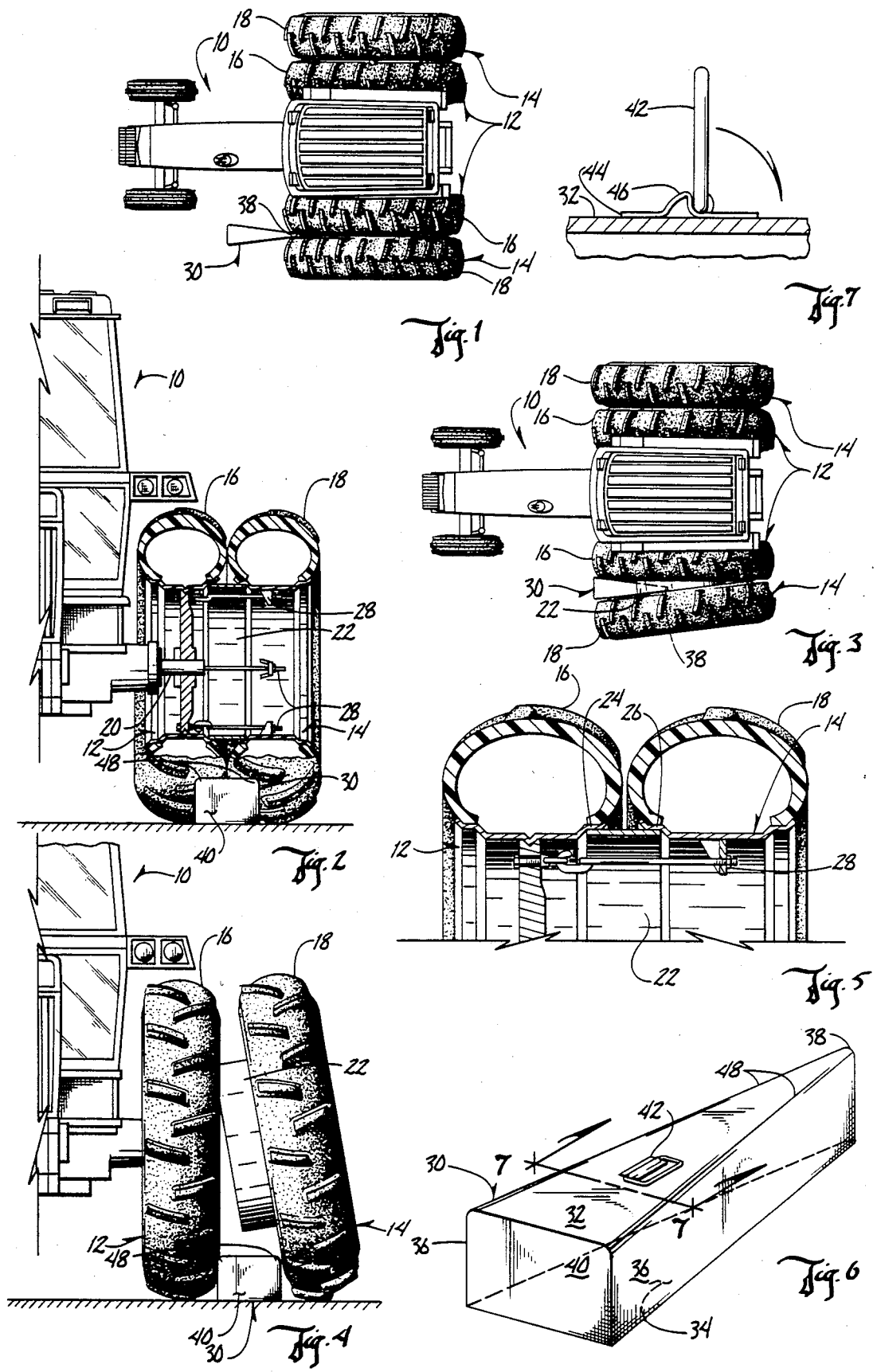

METHOD FOR REMOVING DUAL WHEELS FROM TRACTORS

BACKGROUND OF THE INVENTION

It is common for agricultural tractors and the like to utilize dual wheels secured to the primary wheels of the tractor. Normally, some type of band or flange attached to one wheel is frictionally fit within the other wheel with the wheels being tied together by nut and bolt assemblies. The tight interlocking fit of the frictional band makes the removal of the dual wheel from the primary wheel difficult. Also, debris which collects on the wheels and band, along with corrosion, add to the difficulty in separating the wheels.

Therefore, a primary objective of the present invention is the provision of a method and means for easily removing a dual wheel from a primary wheel of a tractor.

A further objective of the present invention is the provision of a method and means for one person to remove dual wheels from primary wheels.

A still further objective of the present invention is the provision of a heavy duty wedge for the removal of dual wheels from primary wheels and a method of using the same.

Another objective of the present invention is the provision of a means for removing dual wheels from primary wheels which is economic to manufacture and durable in use.

SUMMARY OF THE INVENTION

A wedge is provided for the removal of dual wheels from primary wheels of a tractor. The wedge has opposite ends, a top, a bottom, and opposite sides which converge towards one end to define the wedge point. A handle is attached to the top of the wedge such that it is portable and can be easily positioned for use.

To remove a dual wheel from a primary wheel, the nuts are removed from the bolts which tie the wheels together. The wedge is then positioned on the ground such that the point of the wedge is adjacent the perimeter of the tires and positioned therebetween and the longitudinal axis of the wedge is parallel with that of the tractor. In this position, the sides of the wedge are vertically disposed. The tractor is then driven towards the wedge whereby the wedge forcibly separates the dual wheel from the primary wheel as the increased width of the wedge is forced between the tires of the two wheels.

BRIEF DESCRIPTION OF THE DRAWINGS

FIG. 1 is a top plan view of an agricultural tractor having dual wheels attached to primary wheels.

FIG. 2 is a partial sectional front elevational view of the tractor shown in FIG. 1.

FIG. 3 is a top plan view showing the use of the tire wedge to separate a dual wheel from a primary wheel.

FIG. 4 is a partial front elevational view showing the dual wheel being separated from the primary wheel by the tire wedge.

FIG. 5 is an enlarged view showing how the dual wheel is secured to the primary wheel.

FIG. 6 is a perspective view of the tire wedge.

FIG. 7 is a partial sectional end view of the wedge showing the handle thereof.

DETAILED DESCRIPTION OF THE DRAWINGS

With reference to the drawings, reference numeral 10 generally designates an agricultural tractor having primary wheels 12 and dual wheels 14. Primary wheel 12 has a tire 16 mounted thereon and dual wheel 14 has a tire 18 mounted thereon.

Tractor 10 includes an axle 20 upon which primary wheel 12 is mounted. Dual wheel 14 is secured to primary wheel 12 in any conventional manner. For example, a nonslip band 22 may be frictionally fit between the outer bead 24 of primary wheel 12 and the inner bead 26 of dual wheel 14. A plurality of nut and bolt assemblies 28 are secured at opposite ends to each of the wheels so as to tie the wheels together and to further tighten the frictional engagement of band 22 with beads 24 and 26 of the respective wheels.

A tire wedge 30 is provided to facilitate the removal of dual wheel 14 from primary wheel 12. Wedge 30 includes a top 32, a bottom 34, opposite sides 36 which converge toward one another to define a pointed forward end 38, and a rear end 40. Wedge 30 has a handle 42 connected to top 32 by a handle bracket 44 secured to top 32. Bracket 44 permits the pivotal movement of handle 42 from the lowered position shown in FIG. 6 to the raised position shown in FIG. 7 and includes a stop element 46 which limits such pivotal movement to 90°.

To remove dual wheel 14 from primary wheel 12, the plurality of nut and bolt assemblies 28 are disassembled by removing the nuts from the bolts. Wedge 30 is then placed upon the ground such that its longitudinal axis is aligned with that of the tractor and such that pointed end 38 is adjacent the perimeter of tires 16 and 18 and positioned therebetween. Tractor 10 is then driven towards wedge 30, which is stationary upon the ground, such that the wedge forcibly separates dual wheel 14 from primary wheel 12 as the increased width of wedge 30 is forced between tires 16 and 18. Preferably, wedge 30 is positioned in front of wheels 12 and 14 such that the tractor can be driven forwardly, however, wedge 30 can also be positioned behind wheels 12 and 14, in which case, tractor 10 is driven rearwardly. It is noted that the upper edges 48 of wedge 30 are rounded so as to minimize damage to tires 16 and 18 during use of wedge 30.

What is claimed is:

1. A method for removing a dual wheel from a primary wheel of a tractor having a longitudinal axis, said dual wheel being secured to said primary wheel by a band frictionally engaging each wheel and by a plurality of nuts and bolts, said dual wheel and said primary wheel each having a tire mounted thereon, said primary and said dual tires engaging the ground and supporting the weight of said tractor, said method comprising:
   removing said nuts from said bolts,
   positioning a wedge on the ground such that the point thereof is between said primary and dual tires adjacent the perimeter thereof and such that the diverging sides of said wedge are vertically disposed,
   aligning said wedge such that the longitudinal axis thereof is parallel with that of said tractor, and
   driving said tractor toward said wedge so that said band passes over said wedge while at the same time said dual and primary tires engage the ground and bear the weight of said tractor, whereby said wedge forcibly separates said dual wheel from said primary wheel as the increased width of said wedge is forced between said tires of said primary and dual wheels.

2. The method of claim 1 wherein said wedge is stationary.

* * * * *